United States Patent [19]

Dyer

[11] Patent Number: 4,595,092

[45] Date of Patent: Jun. 17, 1986

[54] LOAD-PUSHER ASSEMBLY FOR CONVEYOR SYSTEMS

[75] Inventor: Thomas A. Dyer, Greenwood, Ind.

[73] Assignee: Pentek Corporation, Indianapolis, Ind.

[21] Appl. No.: 706,246

[22] Filed: Feb. 28, 1985

Related U.S. Application Data

[63] Continuation of Ser. No. 391,960, Jun. 24, 1982, abandoned, which is a continuation-in-part of Ser. No. 164,610, Jun. 30, 1980, abandoned.

[51] Int. Cl.⁴ .............................................. B65G 47/26
[52] U.S. Cl. .................................... 198/456; 198/718; 271/240
[58] Field of Search ............... 198/372, 413, 434, 456, 198/458, 597, 627, 718, 746, 748; 414/28; 271/226-228, 238, 240, 248, 250, 253

[56] References Cited

U.S. PATENT DOCUMENTS

| | | | |
|---|---|---|---|
| 2,815,111 | 12/1957 | Capps et al. | 198/597 |
| 2,986,262 | 5/1961 | Powers | 198/456 |
| 2,993,583 | 7/1961 | Sykes | 198/457 |
| 3,321,063 | 5/1967 | Blume | 198/366 |
| 3,422,948 | 1/1969 | Burt | 198/372 |
| 3,647,092 | 3/1972 | Bulat et al. | 414/28 |
| 3,655,025 | 4/1972 | Wilkin | 198/748 |
| 4,088,224 | 5/1978 | Kittredge | 198/790 |
| 4,170,292 | 10/1979 | Lang | 198/746 |
| 4,204,788 | 5/1980 | Massey | 198/456 |
| 4,243,137 | 1/1981 | Laurenz | 198/748 |

FOREIGN PATENT DOCUMENTS

308953 9/1971 U.S.S.R. .............................. 414/28

Primary Examiner—Joseph E. Valenza
Attorney, Agent, or Firm—Barnes & Thornburg

[57] ABSTRACT

In a conveyor system of the type having laterally spaced side frame members supporting a plurality of load-carrying rollers for rotation about transverse axes to transport a load in a longitudinal direction between an upstream end and a downstream end of the conveyor system, a load-pusher assembly comprises first and second assembly sections including drive and idler mechanisms, respectively, two tracks spanning the space between the side frame members of the conveyor section in parallel relationship to the transverse axes of the load-carrying rollers, a first movable trolley carried by the tracks for pushing the load in a second direction transverse to the first direction, a second movable trolley carried by the tracks for pushing the load in a third direction opposed to the second direction, and linkages connecting the trolleys. Drive linkages couple the drive mechanism to the two trolleys and idler linkages couple the two trolleys to each other whereby movement of one of the trolleys in response to the drive mechanism causes movement of the other trolley in an opposed direction to center the load therebetween on the load-carrying rollers.

21 Claims, 15 Drawing Figures

LOAD-PUSHER ASSEMBLY FOR CONVEYOR SYSTEMS

This is a continuation of Ser. No. 391,960 filed June 24, 1982, now abandoned, which was a continuation-in-part of Ser. No. 164,610 file June 30, 1980, now abandoned.

The present invention relates generally to live roller conveyor systems for transporting loads in a longitudinal direction between an upstream end and a downstream end. More particularly, the present invention relates to an improved load-pusher device for either pushing loads laterally off a conveyor or for centering loads on the load-carrying rollers of a conveyor.

In general, a live conveyor system is defined as a conveyor having a driving unit for propelling an endless conveying means which, through frictional contact with a plurality of load-carrying rollers, transports the load from an upstream end to a downstream end of the conveyor system without the assistance of gravity. Furthermore, an accumulating live conveyor system includes means specifically designed to permit loads to remain stationary on the conveyor system in particular zones without stopping or interferring with the operation of the driving unit or endless conveying means. Accordingly, with an accumulating live conveyor system, a load can be accumulated in a particular zone and be removed from the conveyor system by a device specifically designed for pushing the load off of the load-carrying rollers.

Load-pusher devices, as they are sometimes called, are generally well known to those skilled in the art. The conventional load pusher devices usually include one section located to one side of the conveyor system and extending laterally therefrom and another section contained within the side frame assembly of the conveyor system. These sections usually include the drive and take-up or idler mechanisms for a movable trolley. A head for engaging a load is typically supported by the trolley which is movable from the laterally extending section on one side of the conveyor system to the edge of the opposite side of the conveyor system to push the load off of the load-carrying rollers. However, many times the load does not get pushed completely clear of the conveyor system because the trolley head is not projectable beyond the edge of the conveyor system. Furthermore, because a section of the load-pusher device is contained within the side frame assembly of the conveyor system, it is necessary to stop the entire conveyor system in order to repair and/or service the load-pusher device.

Because conventional load-pusher devices for pushing loads off the load-carrying rollers are only capable of operation in one direction at a time, any change in the direction in which the load is to be pushed after installation of the load-pusher device requires substantial modification and/or reorientation of the device. Accordingly, if it should become necessary or desirable to subsequently change the direction in which the loads are pushed, it is necessary to disassemble the conveyor system and load-pusher device and change the orientation of the pusher device relative to the conveyor system by approximately 180°. Furthermore, the design of conventional load-pusher devices makes it difficult to alternately push the loads in two different directions using the same pusher device.

Another type of load-pusher assembly includes two trolleys which are movable in opposed directions. Each trolley includes a head for engaging the load and pushing it toward the center of the load-carrying rollers. The trolleys must be moved coincidently in order to assure that the load is properly centered therebetween. A simple drive and linkage system for simultaneously moving the trolleys is desirable.

It is therefore one object of the present invention to provide a load-pusher assembly for use in a live conveyor system having increased operation efficiency and a higher degree of versatility than conventional load-pusher devices.

Another object of the present invention is to provide a drive and linkage system for a load-pusher assembly which prevents misalignment of the trolley or trolleys with respect to the loads.

A further object of the present invention is to provide a load pusher assembly for centering loads on the load-carrying rollers of a conveyor system having a simple and efficient system for simultaneously moving two trolleys in opposed directions to engage and center loads on the load-carrying rollers.

According to the present invention, the load-pusher assembly includes a conveyor section forming a part of the overall conveyor system and drive and idler sections which are located on either side of the conveyor section external to the conveyor system. The operating portions of the load-pusher assembly of the present invention are located external to the side frame assembly of the conveyor system and are therefore easily accessible for repair and service without interferring with or stopping the operation of the conveyor system.

In one embodiment, the load-pusher assembly includes a pair of elongated tracks spanning the conveyor section in parallel relationship to each other and in parallel relationship to the transverse axes of the load-carrying rollers of the conveyor system. The tracks connect the idler and drive sections of the assembly and extend to the outer edges of the drive and idler sections. A movable trolley is carried by the tracks and includes a head for engaging and pushing the load off of the conveyor section onto either the drive or idler section in response to movement of the trolley. The head of the pusher assembly extends well beyond the outer edge of the conveyor system, and in fact extends beyond the outer edge of one or both of the drive and/or idler sections of the assembly to assure that the load is completely removed from the load-carrying rollers of the conveyor system.

The trolley includes two carriages for engaging the tracks. Each carriage is connected to means for propelling the carriages along the track from one side of the conveyor section to the other side of the conveyor section and vice versa along a path transverse to the longitudinal direction of the conveyor system. The trolley also includes take-up means for adjusting the tension of the propelling means and the orientation of the pusher head relative to the load. Limit switches are provided in both the idler and drive sections to limit and reverse the direction of movement of the trolley along the tracks. The carriages each include an elongated bracket for supporting the pusher head and the head is removable. Furthermore, it is possible to mount two separate heads to the support brackets so that loads can be pushed alternately to both sides of the conveyor system employing the same load-pusher assembly.

In another embodiment, the load-pusher assembly includes a first movable trolley carried by the tracks for pushing the load in a direction transverse to the longitudinal direction of the conveyor system, a second movable trolley carried by the tracks for pushing the load in a direction opposed to the first trolley, and linkages connecting the trolleys so that they move simultaneously to center the load therebetween on the load-carrying rollers. Drive linkages couple the drive mechanism to the two trolleys and idler linkages couple the two trolleys to each other whereby movement of one of the trolleys in response to the drive mechanism causes coincidental movement of the other trolley in an opposed direction.

Various other features and advantages of the present invention will become apparent in view of the following detailed description of an embodiment thereof exemplifying the best mode of carrying out the invention as presently perceived, which description should be considered in conjunction with the drawings, in which:

Figure 1:
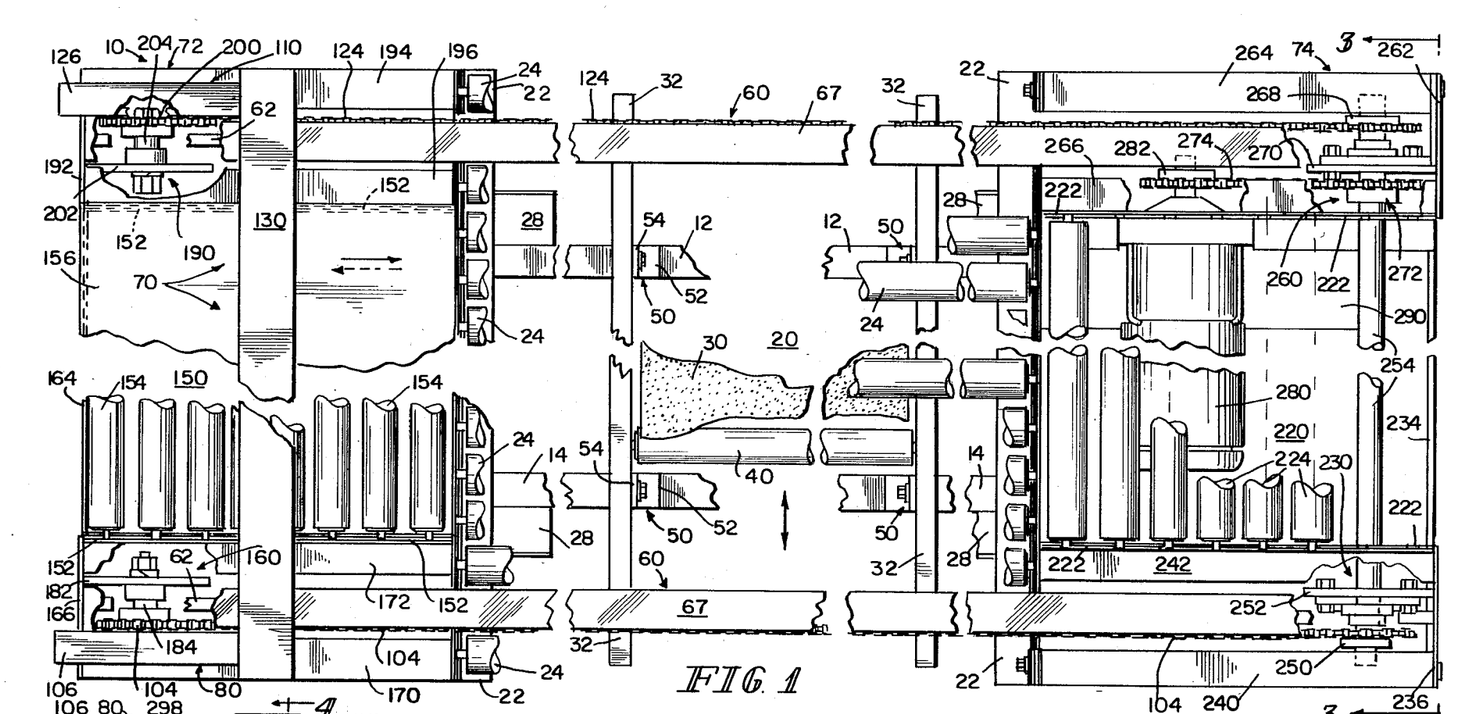
FIG. 1 is a top elevational view, partly broken away, of a load-pusher assembly according to the present invention.
Figure 2:
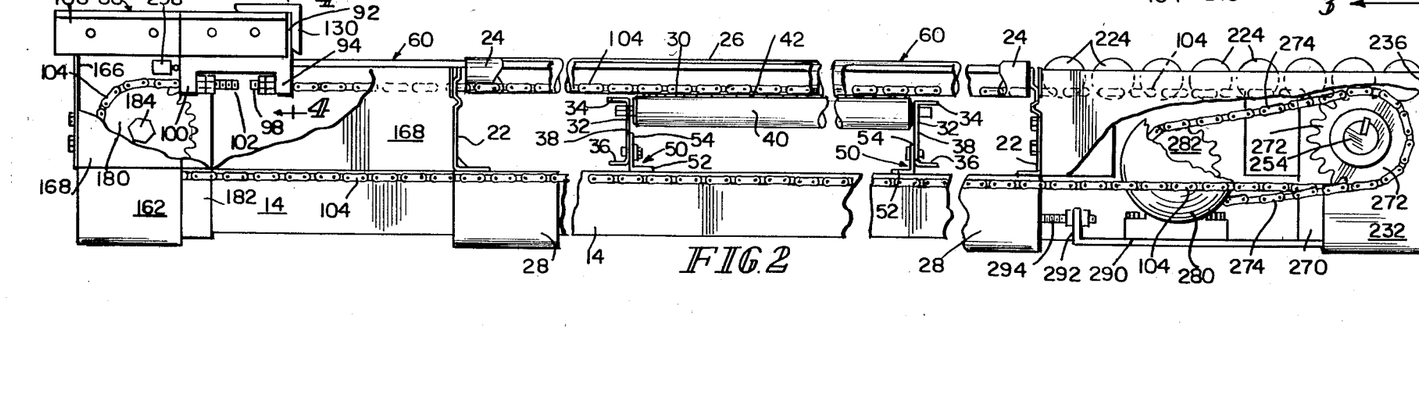
FIG. 2 is a side elevational view, partly broken away, of the assembly of FIG. 1.

Illustrated in FIGS. 1 and 2 is a load-pusher or pusher-exit assembly 10 for a live roller conveyor system which is power-operated to transport loads or articles (not shown) in a longitudinal direction, as represented by the vertical arrows in FIG. 1, between an upstream end and a downstream end (not shown) over one or more intermediate conveyor system sections (not shown) which are connected in series to provide a continuous elongated conveyor system. The load-pusher assembly 10 is a single integrated unit including a conveyor section 20 which can be connected to other conveyor sections of the conveyor system, and which includes means for accumulating loads on the conveyor section 20 without interference with the operation of the driving unit for the conveyor system. The assembly 10 further includes an idler section 150 located adjacent and external to one side of the conveyor section 20, and a drive section 220 located adjacent and external to the other side of the conveyor section 20. The three sections 20, 150, 222 are commonly connected and supported by two elongated spaced parallel tie members 12, 14 which are hollow and rectangular in cross section.

Referring to FIGS. 1 and 2, the central accumulating live roller conveyor section 20 in general may be constructed in one of the many ways well known in the conveyor art so that it is adapted to the conveyor sections of one or more conveyor systems. Importantly, it should be noted that the conveyor section 20 should have a construction which is compatible with the construction of the conveyor sections of the system in which the load-pusher assembly 10 will be installed.

Referring more particularly to FIGS. 1 and 2, the side frame assembly of the conveyor section 20 includes two lateral side support members 22 provided in spaced parallel relationship to support a plurality of load-carrying rollers 24 for rotation about the transverse axes which are suitably spaced apart and arranged in a common load-transporting array in the longitudinal direction of the live roller conveyor system, as indicated by the vertical arrows in FIG. 1. As best illustrated in FIG. 2, the side support members 22 are rigid profiled upright rails having a generally L-shaped cross section. The top or load-supporting surfaces 26 of the rollers 24 are supported above the upper edge of the support members 22 to facilitate movement of loads on and off of the conveyor section 20.

The two parallel side support members 22 of the conveyor section 20 are elevated in spaced relationship to the base or floor surface to which the assembly 10 and conveyor system are attached by leg angles 28, that is, legs having a J-shaped cross section, and the tie members 12, 14. The leg angles 28 are connected by the tie members 12, 14 which fix the two side support members 22 in a predetermined spaced parallel relationship determined by the length of the load-carrying rollers 24. As can best be seen in FIG. 2, when the tie members 12, 14 are secured to the leg angles 28, they are also elevated in spaced relationship to the base or floor surface by upturned lip portions (not shown) of the leg angles 28.

When connected to other conveyor sections of a live roller conveyor system, the conveyor section 20 is power-driven by an endless conveying means 30 which is held against the load-carrying rollers 24 to propel the rollers 24 through friction contact therewith. Illustratively, the endless conveying means 30 is a flexible belt formed of suitable material so as to develop frictional contact with the peripheral surfaces of the load-carrying rollers 24. It should be noted that the endless conveying means 30 could also be a rope, chain, etc., which is formed of a material similar to that of the belt described above.

The endless conveying means 30 has an upper power-delivering or frictional-contact pass arranged for frictional driving contact with the load-carrying rollers 24 and a lower return or idle pass. In live roller conveyor systems, the endless conveying means 30 is powered by suitable driving means which is located within a drive zone (not shown) of the complete conveyor system.

Continuing to refer to FIGS. 1 and 2, the conveyor section 20 of the load-pusher assembly 10 further includes two elongated lateral inner side support channels 32 which are generally C-shaped in cross section and positioned in spaced parallel relationship to each other between the two outer side support members 22. As can best be seen in FIG. 2, the inner side support channels or rails 32 include an outwardly and transversely extending upper flange 34, an outwardly and transversely extending lower flange 36, and a rigid upright web portion 38 interconnecting the upper and lower flanges 34, 36. Formed in the upright web portion 38 of each inner side support channel 32 are elongated slots (not shown) extending vertically in relation to the plane of the transverse axes of the load-carrying rollers 24. These elongated slots in the inner side support channels 32 of conveyor section 20 allow the inner side support channels 32 to be moved vertically relative to the plane of the transverse axes of the load-carrying rollers 24.

The inner side support channels 32 rotatably support a plurality of pressure rollers 40 which are rotatable about transverse axes located below and in parallel to the transverse axes of the load-carrying rollers 24. The pressure rollers 40 include upper surfaces 42 which are supported above the upper flange 34 of the channel 32 and which carry the upper frictional driving or contact pass of the endless conveying means 30. In the driving position of the conveyor section 20, as illustrated in FIG. 2, the upper frictional contact pass of the endless conveying means 30 is captured between the pressure rollers 40 and the load-carrying rollers 24 to effect rotation of the load-carrying rollers 24 and propel loads or articles over the conveyor section 20. The inner side support channels 32 may also support idler rollers (not shown) below the pressure rollers 40 to carry the lower return or idle pass of the endless conveying means 30 above the plane of the lower flange 36 of the support channels 32. It is important to note that the inner side support channels 32 have a length which is generally less than the length of the outer side support members 22 of the conveyor section 20 so that they do not interfere with the operation of adjoining sections of the conveyor system.

The inner side support channels 32 are mounted within the conveyor section 20 by accumulator mounting brackets 50 which are generally L-shaped in cross section. Each mounting bracket 50 includes an inwardly and transversely extending flange 52 which is secured to a tie member 12, 14 by screws, welding, or other conventional means. Each mounting bracket 50 also includes an upwardly extending rigid web portion 54. Formed in the web portion 54 are slots (not shown) which extend longitudinally in the direction of the conveyor system, as indicated by the vertical arrow in FIG. 1, and which are therefore horizontal relative to the plane of the transverse axes of the load-carrying rollers 24 and the pressure rollers 40. The inner side support channels 32 are loosely connected to the mounting brackets 50 to allow upward, downward, and pivotal movement of the inner side support channels 32 relative to the brackets 50. Accordingly, the mounting brackets 50 provide fulcrums for the raising and lowering of the ends of the inner side support channels 32 by independently operable jack means (not shown) positioned at the ends of the inner side support channels 32 to simultaneously raise and lower the corresponding ends of the inner side support channels 32. By raising and lowering the inner side support channels 32, the pressure rollers 40 carrying the upper frictional contact pass of the endless conveying means 30 are correspondingly raised and lowered to engage and disengage, respectively, the endless conveying means 30 and the load-carrying rollers 24 associated with the conveyor section 20 to selectively transport and accumulate loads, respectively, on the conveyor section 20.

Although not shown, it should be understood that the jack means are connected to an air supply source and the flow of air to each of the jack means is independently controllable from a control means (not shown) to selectively raise and lower only the inner side support channels 32 of the conveyor section 20 to remove frictional contact between the endless conveying means 30 and the load-carrying rollers 24 so that the loads remain stationary on the load-carrying rollers of the conveyor section 20 without interferring with the operation of the endless conveying means 30 or the remainder of the conveyor system.

It should also be understood that the load-pusher assembly 10 of the present invention can be used with a non-live conveyor system, that is, a conveyor system whioh does have load-carrying rollers 24 arranged to transport a load from an upstream end to a downstream end of the conveyor system, but which does not have a driving unit for propelling the rollers 24. In a non-live conveyor system, loads are transported over the load-carrying rollers 24 with the assistance of gravity. It is therefore not intended that the present invention be limited to live conveyor systems.

Figures 3, 4, 5:
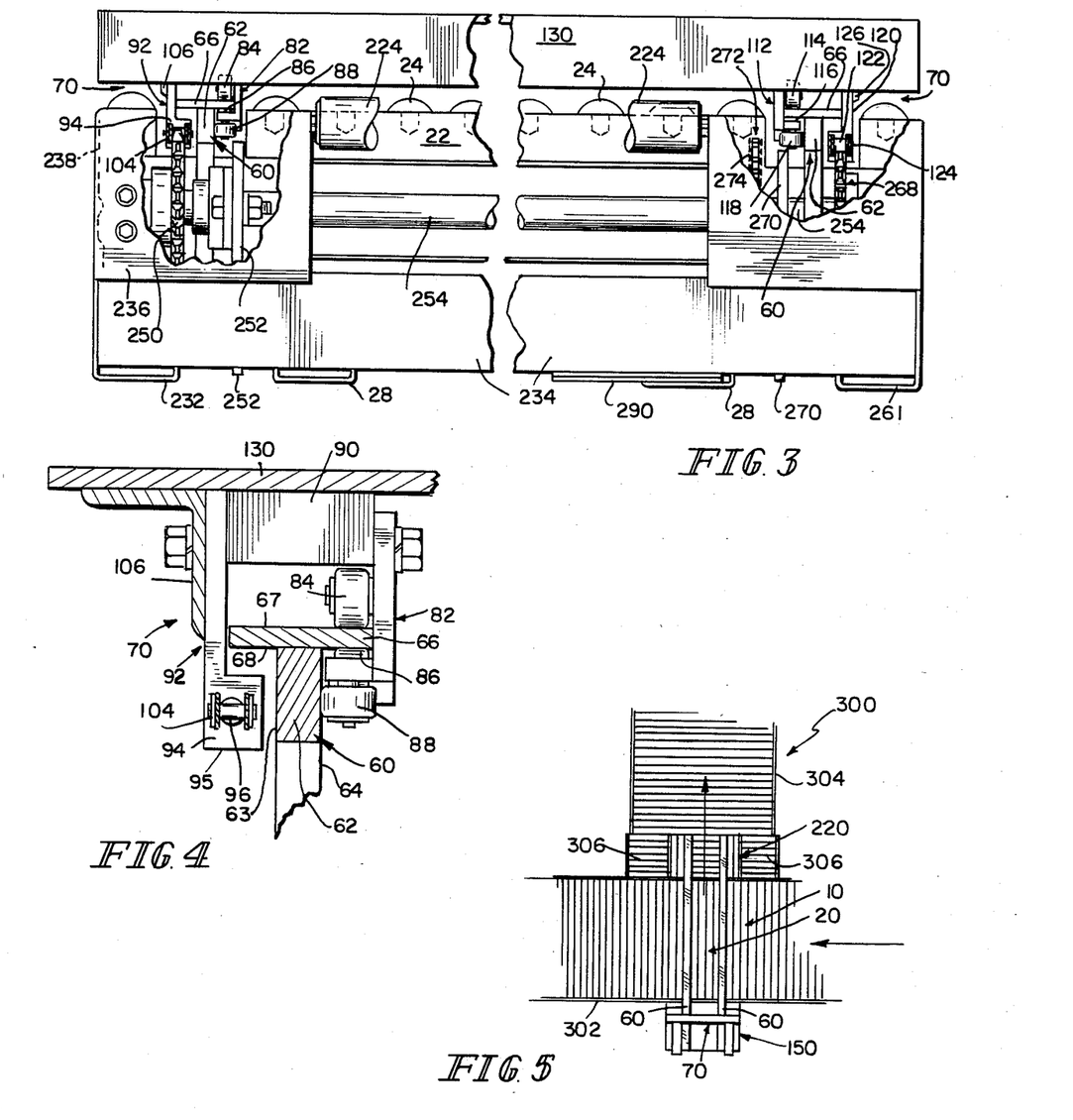
FIG. 3 is an end elevational view, partly broken away, of the assembly of FIG. 1 looking in the direction of lines 3—3 in FIG. 1.
FIG. 4 is a cross-sectional view, partly broken away, of a portion of the assembly of FIG. 1, taken generally along section lines 4—4 in FIG. 2.
FIGS. 5-9 are diagrammatic representations, partly broken away, of various embodiments of conveyor systems, each including the assembly of FIGS. 1-4.

Referring now to FIGS. 1, 2, and 4, two elongated generally T-shaped tracks 60 span the conveyor section 20 in spaced parallel relationship to each other and in spaced parallel relationship to the transverse axes of the load-carrying rollers 24 of the conveyor section 20 and extend laterally in both directions beyond the outer side support members 22 of the conveyor section 20. As illustrated in FIG. 1, the tracks 60 are positioned in proximity to the ends of the conveyor section 20, with each track 60 taking the place of a load-carrying roller 24 and, as best illustrated in FIG. 2, with each track 60 being supported slightly below the load-supporting surfaces 26 of the rollers 24.

Referring more particularly to FIG. 4, each of the tracks 60 includes a vertical track member 62 having an outer surface 63 and an inner surface 64 and a horizontal track member 66 having an upper surface 67 and a lower surface 68. The horizontal track member 66 is secured to the vertical track member 62 by welding or other conventional means, and the horizontal track member 66 has a width which is generally equal to the diameter of the load-carrying rollers 24 so that in replacing a load-carrying roller 24 of the conveyor section 20, the horizontal track member 66 generally occupies the space between adjacent load-carrying rollers 24 which would normally be occupied by the replaced rollers 24.

A trolley 70 is movably carried by the tracks 60 over the conveyor section 20 in directions transverse to the longitudinal direction of the conveyor system, as indicated by the horizontal solid and broken arrows in FIG. 1. Importantly, the trolley 70 is movable transversely from a rest position 72 located in spaced relationship to one side of the conveyor section 20 to a return position 74 located in spaced relation to the other side of the conveyor section 20 and vice versa.

As best illustrated in FIGS. 2 and 4, the trolley 70 includes a first carriage 80 for tracking one of the elongated tracks 60. The carriage 80 includes an inner guide plate 82 which is generally L-shaped in cross section. The inner guide plate 82 includes means for rotatably supporting at least one upper vertical roller 84 for engaging the upper surface 67 of the horizontal track member 66, at least one lower vertical roller 86 for engaging the lower surface 68 of the horizontal track member 66, and at least one lower horizontal roller 88 for engaging the inner surface 64 of the vertical track member 62.

A cross bar 90 interconnects the inner guide plate 82 to an outer toe plate 92 which is generally C-shaped in cross section and opens downwardly. The cross bar 90 is secured to both the inner guide plate 82 and the outer toe plate 92 by welding or other conventional means. The outer toe plate 92 includes a first downwardly projecting leg 94 having an enlarged rectangular lower end 95 which includes an aperture 96 for receiving a first adjustable pin 98 in parallel relationship to the track 60. The outer toe plate 92 also includes a second downwardly projecting leg 100 which likewise includes an enlarged rectangular lower end and an aperture (not shown) provided therein for receiving a second adjustable pin 102 (see FIG. 2). Connected to the adjustable pins 98, 102 are the ends of a first means 104 for propelling the trolley 70 from its rest position 72 to its return position 74 and vice versa. In the illustrative embodiment, the propelling means 104 includes a link chain. As will become apparent from a further description of the load-pusher assembly 10, the outer toe plate 92 of the carriage 80 in cooperation with the adjustable pins 98, 102 provides a take-up means for adjusting the tension of the link chain 104 and aligning the trolley 70 with respect to the loads on the load-carrying rollers 24.

Mounted to the outside of the outer toe plate 92 is an elongated support bracket 106 which is generally L-shaped in cross section and mounted in parallel relationship to the tracks 60. Bracket 106 is removable from the plate 92.

Referring now to FIGS. 1 and 3, the trolley 70 also includes a second carriage 110 constructed generally the same as the first carriage 80 for tracking the other elongated track 60. As most particularly shown in FIG. 3, the second carriage 110 also includes an inner guide plate 112 which is generally L-shaped in cross section. The inner guide plate 112 includes means for rotatably supporting at least one upper vertical roller 114 for engaging the upper surface 67 of the horizontal track member 66, at least one lower vertical roller 116 for engaging the lower surface 68 of the horizontal track member 66, and at least one lower horizontal roller 118 for engaging the inner surface 64 of the vertical track member 62. A cross bar (not shown) connects the inner guide plate 112 to an outer toe plate 122 constructed generally the same as the outer toe plate 92. Although not shown, the outer toe plate 122 includes first and second downwardly projecting legs, each including apertures for receiving adjustable pins. The adjustable pins of the outer toe plate 122 are connected to the ends of a second means 124 for propelling the trolley 70 from its rest position 72 to its return position 74 and vice versa. Mounted to the outside of the outer toe plate 122 is a second elongated support bracket 126 which is also generally L-shaped in cross section and mounted in parallel relationship to the tracks 60. The outer toe plate 122 of the carriage 110 in cooperation with the adjustable pins (not shown) provides a take-up means for adjusting the tension of the link chain 124 and aligning the trolley 70 with respect to the loads on the load-carrying rollers 24.

Referring to FIG. 1, the two support brackets 106, 126 support an elongated pusher head 130 in generally parallel relationship to the longitudinal direction of the conveyor section 20 to engage a load accumulated on the conveyor section 20 in response to movement of the trolley 70 and push the load off of the load-carrying rollers 24 of the conveyor section 20. Pusher head 130 may be either permanently or removably mounted to the brackets 106, 126. The pusher head 130 is generally L-shaped in cross section, and the relationship of the head 130 to the loads accumulated on the conveyor section 20 is adjustable by adjusting the pins 98, 102 (see FIG. 2) of the outer toe plates 92, 122 of the carriages 80, 110, respectively, of the trolley 70. Importantly, it should be noted that the pusher head 130 can be supported by the support brackets 106, 126 to push the load in the direction of the solid horizontal arrow, as viewed in FIG. 1, or to push the load in the direction of the broken horizontal arrow, as viewed in FIG. 1. Furthermore, two pusher heads 130 can be supported by the brackets 106, 126 at opposed ends of the brackets 106, 126 to push loads alternately in both directions indicated by the solid and broken horizontal arrows, as viewed in FIG. 1. The advantage associated with this feature of the trolley 70 will become more apparent in view of the description of the various conveyor systems illustrated in FIGS. 5-9.

Referring again to FIGS. 1 and 2, the idler section 150 of the load-pusher assembly 10 is located adjacent to one side of the conveyor section 20 and external to the side frame assembly of the conveyor section 20 in a location corresponding to the rest position 72 of the trolley 70. The idler section 150 includes a side frame assembly having generally the same construction as the side frame assembly of the conveyor section 20 and including two lateral side support members 152 provided in spaced parallel relationship perpendicular to the side support members 22 of the conveyor section 20. The two lateral side support members 152 support a plurality of load-carrying rollers 154 for rotation about axes which are generally parallel to the longitudinal direction of the conveyor section 20 and therefore perpendicular to the transverse axes of the load-carrying rollers 24 of the conveyor section 20. The load-carrying rollers 154 are not driven, and are therefore freely rotatable with the assistance of gravity. In the illustrative embodiment of the load-pusher assembly 10 with the pusher head 130 supported by the carriages 80, 110 to push a load from left to right from the conveyor section 20, as viewed in FIG. 1, it may be desirable to either remove the load-carrying rollers 154, since they will not be used, or to cover the rollers with a cover plate 156. It will be understood, however, that if the load is being pushed from right to left off the conveyor section 20, as viewed in FIG. 1, or if loads are being pushed in both directions, then the cover plate 156 can be removed to expose the load-carrying rollers 154 for transporting the loads off of the conveyor section 20.

An idler mechanism for the first and second means 104, 124 for propelling the trolley 70 is contained within a first idler compartment 160 located adjacent to a side support member 152 exterior to the side frame assembly of the idler section 150. The first idler compartment 160 is formed by the side support members 22, 152, and includes a leg angle 162, that is a leg having a generally J-shaped cross section, for supporting an end tie member 164 perpendicular to the tie members 12, 14. Secured to the leg angle 162 and end tie member 164 are a fixed end panel 166 and a removable side panel 168. Forming the top of the first idler compartment 160 is an outer load-support plate 170 in generally the same plane as the end of the conveyor section 20 and an inner load-support plate 172 connected to the side support member 152 in spaced relationship to the outer load support plate 170, thereby forming a channel for the track 60.

The first idler compartment 160 houses a portion of the idler mechanism which includes a first sprocket wheel 180 rotatably supported by a mounting bracket 182 which is secured to the end tie member 164 and a shaft 184. The first sprocket wheel 180 is freely rotatable, and includes a plurality of cogs for engaging the first link chain or propelling means 104 for the trolley 70.

Another portion of the idler mechanism is contained within a second idler compartment 190 located adjacent to a side support member 152 exterior to the side frame assembly of the idler section 150 on the opposed side of the side frame assembly from the first idler compartment 160. The second idler compartment 190 is constructed generally the same as the first idler compartment 160 and includes a leg angle (not shown) for supporting the end tie member 164. A fixed end panel 192 and a removable side panel (not shown) are also secured to the leg angle (not shown) and the end tie member 164. The top of the second idler compartment 190 is formed by an outer load-support plate 194 in generally the same plane as the other end of the conveyor section 20, and an inner load-support plate 196 connected to the other side support member 152 in spaced relationship to the outer load-support plate 194 to provide a channel for the other track 60.

The idler mechanism further includes a second sprocket wheel 200 rotatably supported by a second mounting bracket 202 which is secured to the end tie member 164 and a shaft 204. Importantly, the second sprocket wheel 200 is independently rotatable relative to the first sprocket wheel 180. The second sprocket wheel 200 also includes a plurality of cogs for engaging the second link chain or propelling means 124 for the trolley 70.

Referring to FIGS. 1, 2, and 3, the drive section 220 of the load-pusher assembly 10 is located adjacent to the other side of the conveyor section 20 and external to the side frame assembly of the conveyor section 20 in a location corresponding to the return position 74 of the trolley 70. The drive section 220 also includes a side frame assembly having a construction generally the same as the side frame assemblies of the conveyor section 20 and the idler section 150. The side frame assembly of the drive section 220 includes two lateral side support members 222 provided in spaced parallel relationship perpendicular to the side support members 22 of the conveyor section 20 to support a plurality of load-carrying rollers 224 for rotation about axes which are generally parallel to the longitudinal direction of the conveyor section and therefore perpendicular to the transverse axes of the load-carrying rollers 24 of the conveyor section 20. The load-carrying rollers 224 are also not driven, and are therefore freely rotatable with the assistance of gravity as a load is pushed by the trolley from the conveyor section 20 onto the drive section 220 of the load-pusher assembly 10.

The drive section 220 of the load-pusher assembly 10 includes a drive mechanism for driving the first and second propelling means 104, 124 to move the trolley 70 along the tracks 60. The drive mechanism is contained within a first compartment 230 located adjacent to a side support member 222 exterior to the side frame assembly of the drive section 220. The first compartment 230 includes a leg angle 232, that is generally J-shaped in cross section, for supporting an end tie member 234 also perpendicular to the tie members 12, 14. Secured to the leg angle 232 and the end tie member 234 are a fixed end panel 236 and a removable side panel 238. The top of the compartment 230 is formed by an outer load-support plate 240 in generally the same plane as the outer support plate 170 of the take-up section 150 and an inner load-support plate 242 connected to the side support member 222 in spaced parallel relationship to the outer load-support plate 240 to provide a channel for the track 60.

The first compartment 230 houses a portion of the drive mechanism which includes a first sprocket wheel 250 rotatably supported by a mounting bracket 252 which is secured to the end tie member 234 and an elongated shaft 254. The first sprocket wheel 250 also includes a plurality of cogs for engaging the first propelling means 104 for the trolley 70.

Another portion of the drive mechanism is contained within a second drive compartment 260 located adjacent a side support member 222 exterior to the side frame assembly of the drive section 220 on the opposed side of the side frame assembly from the first compartment 230. As best illustrated in FIGS. 1 and 3, the second drive compartment 260 includes a leg angle 261, that is generally J-shaped in cross section, for supporting the end tie member 234. A fixed end panel 264 and a removable side panel (not shown) are secured to the leg angle 261 and the end tie member 234. The top of the second drive compartment 260 includes an outer load-support plate 264 provided in generally the same plane as the outer load support plate 194 of the take-up section 150 and an inner load-support plate 266 connected to the other side support member 222 of the side frame assembly in spaced relationship to the outer load-support plate 264 to provide a channel for the other track 60.

The other portion of the drive mechanism contained within the second drive compartment 260 includes a second sprocket wheel 268 rotatably supported by a mounting bracket 270 which is secured to the end tie member 234 and the elongated shaft 254. The second sprocket wheel 268 includes a plurality of cogs for engaging the second propelling means 124 to drive the propelling means 124 and move the trolley 70 along the tracks 60. It is also important to note that since the first and second sprocket wheels 250, 268 of the drive mechanism are each rotatably supported by the elongated shaft 254, both sprocket wheels 250, 268 rotate simultaneously to propel the first and second carriages 80, 110 of the trolley 70.

Also secured to the elongated shaft 254 and therefore simultaneously rotatable with the first and second sprocket wheels 250, 268 is a third sprocket wheel 272 including a plurality of cogs for engaging a third propelling means or link chain 274.

The third propelling means 274 is driven by a suitable driving means 280 to rotate the elongated shaft 254 and thereby simultaneously move the carriages 80, 110 of the trolley 70. The driving means 280 may include any conventional bidirectional motor. In the illustrative embodiment, the driving means 280 is a motor of the type manufactured by Eurodrive, Inc., of Troy, Ohio and identified by Model No. R60DT90S4BH. Secured to the driving means 280 is a fourth sprocket wheel 282 including a plurality of cogs for engaging the third propelling means 274.

The driving means 280 is secured and supported within the drive section 222 of the load-pusher assembly 10 by a mounting platform 290. The mounting platform 290 includes an upturned flange 292 for receiving a pin 294 which is also secured to the side support member 22 of the conveyor section 20. By adjusting the pin 294, the mounting platform 290 is movable generally parallel to the third propelling means 274 to adjust the tension of the third propelling means 274.

As can best be seen in FIG. 2, limit switches 298 may be provided in both the first and second idler compartments 160, 190 for engaging the carriages 80, 110 of the trolley 70 and providing a signal to indicate that the trolley 70 has reached its rest position 72. Although not shown, limit switches may also be provided in the first and second drive compartments 230, 260 for also engaging the carriages 80, 110 of the trolley 70 and providing a signal to indicate that the trolley 70 has reached its extreme return position 74, and therefore should be returned to its rest position 72. The limit switches provided in the drive compartments 230, 260 provide a signal which reverses the direction of the driving means 280 to move the trolley 70 in the direction of the broken horizontal arrow, as viewed in FIG. 1. It should be understood that the limit switches 298 may not need to be provided in both idler compartments 160, 190 and both drive compartments 230, 260. For example, one limit switch 298 may be provided in one idler compartment 160 or 190, and another limit switch 298 may be provided in one drive compartment 230 or 260. Further, it can be appreciated that in a dual-acting load-pusher assembly 10 according to the present invention, the rest position 72 may also serve as a return position and the return position 74 may also serve as a rest position.

Having described the details of the load-pusher assembly 10, FIGS. 5-9 illustrate various embodiments of conveyor systems employing the load-pusher assembly 10 of the present invention. It will be understood that these embodiments are only intended to be illustrative and that various other combinations of conveyor systems may be constructed using the load-pusher assembly 10. In the FIGS. 5-9, similar parts of the load-pusher assembly 10 shown diagrammatically are identified by the same reference numerals corresponding to such parts in FIGS. 1-4.

Illustrated in FIG. 5 is a live roller conveyor system 300 which includes a first conveyor 302 for transporting loads from an upstream end to a downstream end in a longitudinal direction, as indicated by the horizontal arrow in FIG. 5, and a second conveyor 304 intersecting and perpendicular to the first conveyor 302 for transporting loads from the first conveyor 302 along the second conveyor 304 in the direction, as indicated by the vertical arrow in FIG. 5. The first conveyor 302 includes a single acting load-pusher assembly 10 according to the present invention for pushing loads in a single direction off of the first conveyor 302 onto the intersecting conveyor 304. Outrigger conveyor sections 306 are located adjacent to the sides of the drive section 220 of the load pusher assembly 10 between the first and second conveyors 302, 304 to accommodate various sizes of loads.

Figure 6:
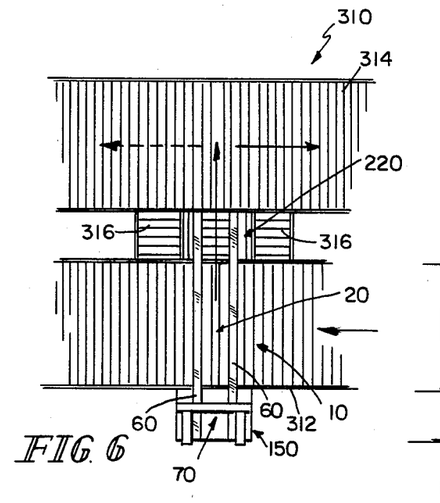

Illustrated in FIG. 6 is a live roller conveyor system 310 which includes a first conveyor 312 for transporting loads from an upstream end to a downstream end in a longtiudinal direction, as indicated by the horizontal arrow, and a second conveyor 314 positioned in spaced parallel relationship to the first conveyor 312 for likewise transporting loads in longitudinal directions as indicated by the arrows, in parallel to the longitudinal direction of the first conveyor 312. The first conveyor 312 includes a single acting load-pusher assembly 10 according to the present invention for pushing loads from the first conveyor 312 in a single direction transverse to the longitudinal directions of the conveyors 312, 314 off of the first conveyor 312 and onto the second conveyor 314. Two outrigger conveyor sections 316 are located adjacent to the sides of drive section 220 of the load-pusher assembly 10 between the first and second conveyors 312, 314 to accommodate various sizes of loads.

Figure 7:
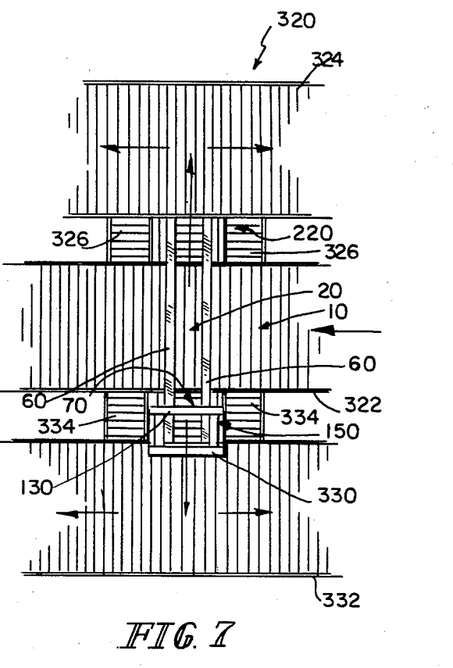

Illustrated in FIG. 7 is another live conveyor roller system 320 which includes a first conveyor 322 for transporting loads in a longitudinal direction, as indicated by the horizontal arrow in FIG. 7, from an upstream end to a downstream end, a second conveyor 324 located in spaced parallel relationship to the first conveyor 322 for transporting loads in longitudinal directions parallel to the longitudinal direction of the first conveyor 222, and a third conveyor 332 also positioned in spaced parallel relationship to the first conveyor 322 on the opposite side of the first conveyor 322 from the second conveyor 324 for also transporting loads in longitudinal directions parallel to the longitudinal direction of the first conveyor 322. The first conveyor 322 includes a dual-acting load-pusher assembly 10 according to the present invention for alternately pushing loads from the first conveyor 322 in two directions transverse to the longitudinal directions of the conveyors 322, 324, 332 off of the first conveyor 322 onto either the second or third conveyors 324, 332. A first set of outrigger sections 326 are located adjacent the drive section 220 of the pusher assembly 10 between the first conveyor 322 and second conveyor 324 and a second set of outrigger sections 334 located adjacent the idler section 150 of the pusher assembly 10 between the first conveyor 322 and the third conveyor 332. Importantly, the trolley 70 of the dual-acting pusher assembly 10 includes a first pusher head 130 for pushing loads from the first conveyor 322 in a transverse direction onto the second conveyor 324 and a second pusher head 330 for pushing loads in a transverse direction from the first conveyor 322 onto the third conveyor 332.

Figure 8:
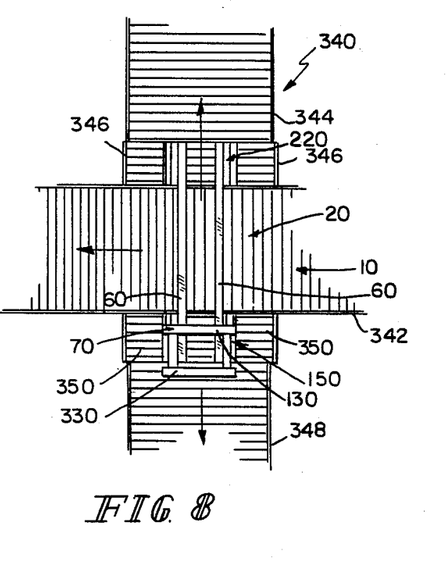

Illustrated in FIG. 8 is a further embodiment of a live roller conveyor system 340 which includes a first conveyor 342 for transporting loads from an upstream end to a downstream end in a longitudinal direction, as indicated by the horizontal arrow in FIG. 8, a second conveyor 344 intersecting and perpendicular to the first conveyor 342, and a third conveyor 348 likewise intersecting and perpendicular to the first conveyor 342 and also in generally the same plane as the second conveyor 344. The first conveyor 342 includes a dual-acting load-pusher assembly 10 according to the present invention for pushing loads from the first conveyor 342 in transverse directions, as indicated by the vertical arrows in FIG. 8, onto either the second conveyor 344 or the third conveyor 348. As in the previous examples, outrigger sections 346 are located adjacent the drive section 220 of the pusher assembly 10 between the first conveyor 342 and the second conveyor 344 and outrigger sections 350 are located adjacent the idler section 150 of the pusher assembly 10 between the first conveyor 342 and the third conveyor 348. In order to accomplish the dual action of the pusher assembly 10, the trolley 70 includes a pusher head 130 for pushing the loads from the first conveyor 342 onto the second conveyor 344 and a pusher head 330 for pushing the loads from the first conveyor 342 onto the third conveyor 348.

Figure 9:
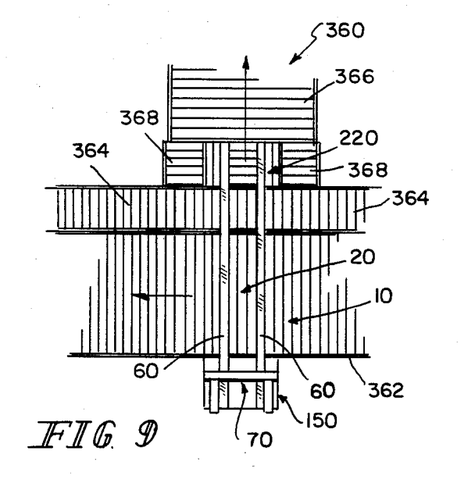

Another embodiment of a live roller conveyor system 360 including an expanded version of the load-pusher assembly 10 according to the present invention is illustrated in FIG. 9. The conveyor system 360 includes a first conveyor 362 for transporting loads in a longitudinal direction, as indicated by the horizontal arrow in FIG. 9, from an upstream end to a downstream end and a second conveyor 366 intersecting and perpendicular to the first conveyor 362. The first conveyor 362 includes an elongated outrigger section 364 running in parallel to the longitudinal direction of the first conveyor 362 so that the first conveyor 362 has the capability of handling oversized loads. The first conveyor 362 also includes an expanded version of a single acting load-pusher assembly 10 according to the present invention for pushing loads from the first conveyor 362 in a transverse direction, as indicated by the vertical arrow in FIG. 9, onto the intersecting second conveyor 366. Located adjacent the drive section 220 of the pusher assembly 10 are outrigger sections 368 which are positioned between the outrigger section 364 of the first conveyor 362 and the second conveyor 366.

As exemplified by the various illustrative embodiments of live roller conveyor systems shown in FIGS. 5-9, the load-pusher assembly 10 of the present invention is highly versatile and adaptable to various combinations of conveyors to push loads from one conveyor to one or more adjacent conveyors. Furthermore, the load-pusher assembly 10 is adaptable to push loads in one or more directions transverse to conveyors, without removing or reversing the pusher assembly 10. These important features increase the overall operation efficiency of the load-pusher assembly 10 of the present invention.

Figure 10:
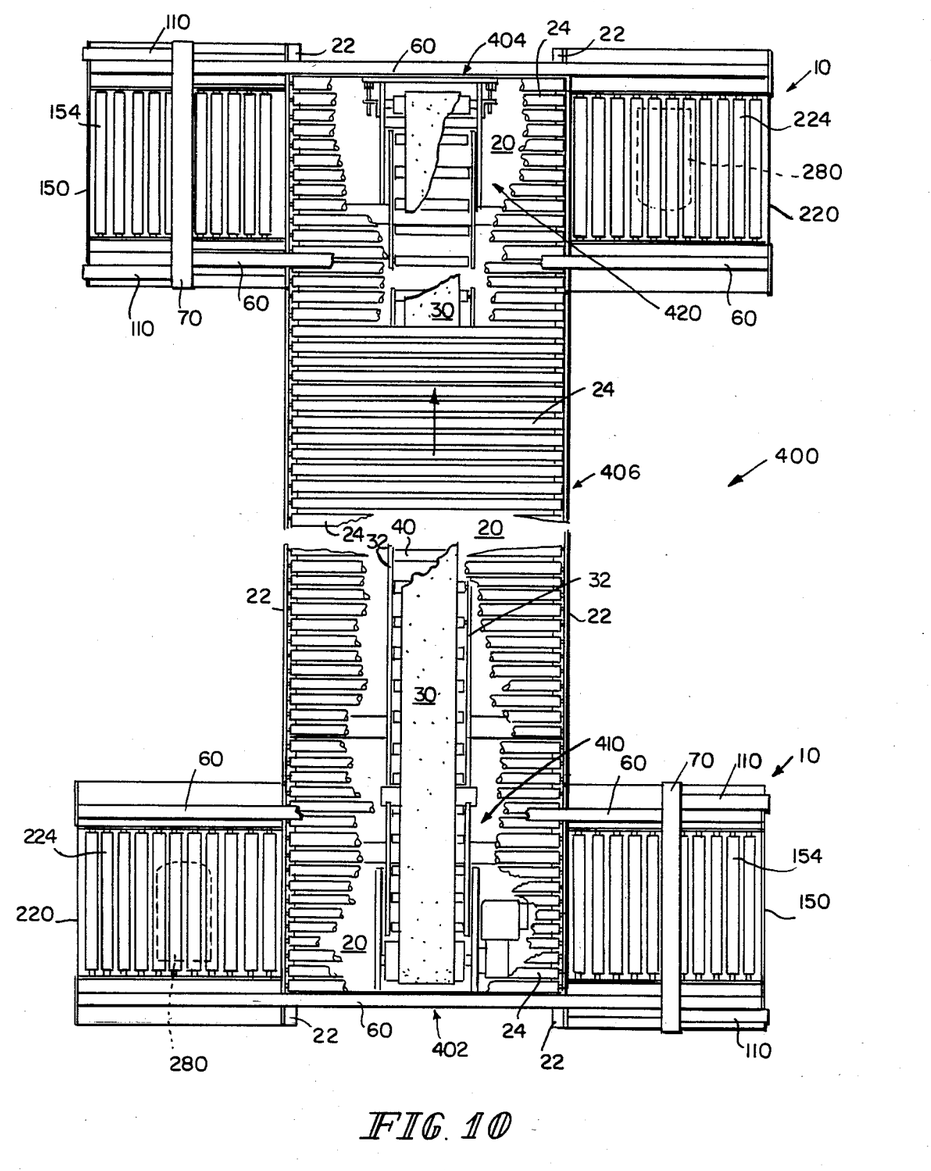
FIG. 10 is a top elevational view, partly broken away, of a live roller conveyor system including load-pusher assemblies of the present invention positioned at both the upstream and downstream ends thereof.

Referring now to FIG. 10, one of the features of the load-pusher assembly 10 of the present invention is that the idler and drive sections 150, 220, respectively, of the assembly 10 are located outside the conveyor section 20 of the assembly 10. Accordingly, the interior of the conveyor section 20 of the assembly 10 is unoccupied by any of the mechanisms associated therewith. This allows the conveyor section 20 of the assembly 10 to include either the drive or take-up assemblies 410, 420, respectively, of the conveyor system 400 so that the assembly 10 may be located at either the upstream end 402 or downstream end 404 of the conveyor system 400.

Illustrated in FIG. 10 is a live roller conveyor system 400 which is power-operated to transport loads or articles (not shown) in a longitudinal direction, as indicated by the arrow, between an upstream zone 402 and a downstream zone 404 over one or more intermediate zones 406 interconnecting the upstream and downstream zones 402, 404. Each zone 402, 404, 406 includes a conveyor section 20, and the conveyor sections 20 are connected to provide a continuous elongated conveyor system 400.

Each of the conveyor sections 20 comprising the complete live roller conveyor system 400 includes a side frame assembly which in general may be any one of a number of side frame assemblies well known in the conveyor art. In the illustrative embodiment, the side frame assembly of each section 20 includes two lateral side support members 22 provided in spaced parallel relationship to support a plurality of load-carrying rollers 24 for rotation about transverse axes which are suitably spaced apart and arranged in a common load-transporting array in the longitudinal direction of the conveyor system, as indicated by the arrow in FIG. 10.

Each of the conveyor sections 20 also includes means for coupling the sections 20 together to form the elongated conveyor system 400.

The live conveyor system 400 is power-driven by an endless driving or conveying means 30 which is held against the load-carrying rollers 24 to propel the rollers 24 through friction contact therewith.

As previously described, each conveyor section 20 further includes two elongated lateral inner side support channels 32 which are generally C-shaped in cross section and positioned in spaced parallel relationship to each other between the two outer side support members 22.

The inner side support channels 32 rotatably support a plurality of pressure rollers 40 which are rotatable about transverse axes located below and in parallel to the transverse axes of the load-carrying rollers 24. The length of the inner side support channels 32 and the number of pressure rollers 40 supported by the support channels 32 will be determined by the overall length of the conveyor section 20 used in the conveyor system 400. Accordingly, various lengths of conveyor sections 20 and inner side support channels 32 can be prefabricated to construct an elongated conveyor system 400 of a desired overall length.

According to the present invention, an accumulating drive assembly 410 for propelling the endless conveying means 30 is located in the upstream or drive zone 402 of the conveyor system 400 and is incorporated into the conveyor section 20 of a load-pusher assembly 10 of the present invention. Heretofore, either the drive or idler sections 150 or 220 of conventional load-pushers have been located in the conveyor section 20, therefore making it impossible to also include the drive assembly 410 of the conveyor system 400. Accordingly, conventional load pushers could not be located in the upstream or drive zone 402 of the conveyor system 400.

Illustratively, the drive assembly 410 incorporated in the conveyor section 20 of the load-pusher assembly 10 has the same general construction as the drive assembly section disclosed in U.S. Pat. No. 4,293,065, entitled "DRIVE/TAKE-UP ASSEMBLY FOR ACCUMULATING LIVE ROLLER CONVEYOR SYSTEMS," which is assigned to the same assignee as the present invention. Accordingly, the description of the drive assembly section included in U.S. Pat. No. 4,293,065 is hereby made a part hereof by incorporating it by reference into the present disclosure.

Further according to the present invention, an accumulating take-up assembly 420 for adjusting the tension of the endless conveying means 30 is located in the downstream or take-up zone 404 of the conveyor system 400 and is incorporated into the conveyor section 20 of a load-pusher assembly 10 of the present invention. As previously described, it has heretofore been impossible to include the take-up assembly 420 of the conveyor system 400 in the conveyor section 20 of conventional load pushers, and therefore conventional load pushers could not be located in the downstream or take-up zone 404 of the conveyor system 400.

Illustratively, the take-up assembly 420 incorporated in the conveyor section 20 of the load-pusher assembly 10 has the same general construction as the take-up assembly section disclosed in U.S. Pat. No. 4,293,065, entitled "DRIVE/TAKE-UP ASSEMBLY FOR ACCUMULATING LIVE ROLLER CONVEYOR SYSTEMS," which is assigned to the same assignee as the present invention. Accordingly, the description of the take-up assembly section included in U.S. Pat. No. 4,293,065 is hereby made a part hereof by incorporating it by reference into the present disclosure.

In accordance with this invention, an elongated live conveyor system 400 which includes drive and take-up assemblies 410, 420 can include one or more load-pusher assemblies 10 located in either one or both of the conveyor zones 402, 404 which include the drive and take-up assemblies 410, 420, respectively.

Figure 11:
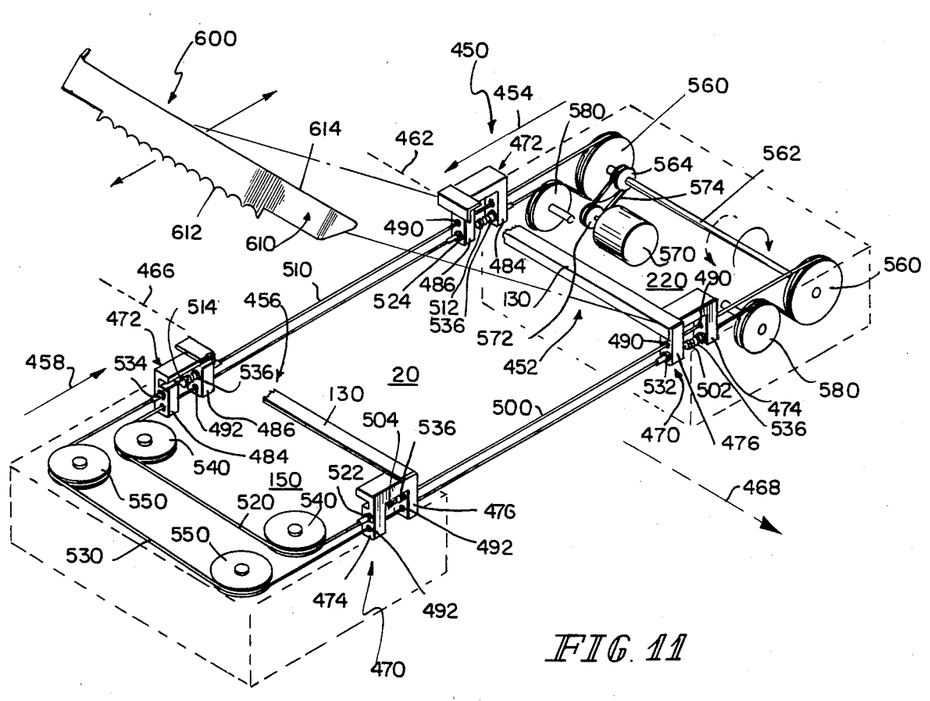
FIG. 11 is a diagrammatic view of another embodiment of a load-pusher assembly embodying the present invention.
Figure 12:
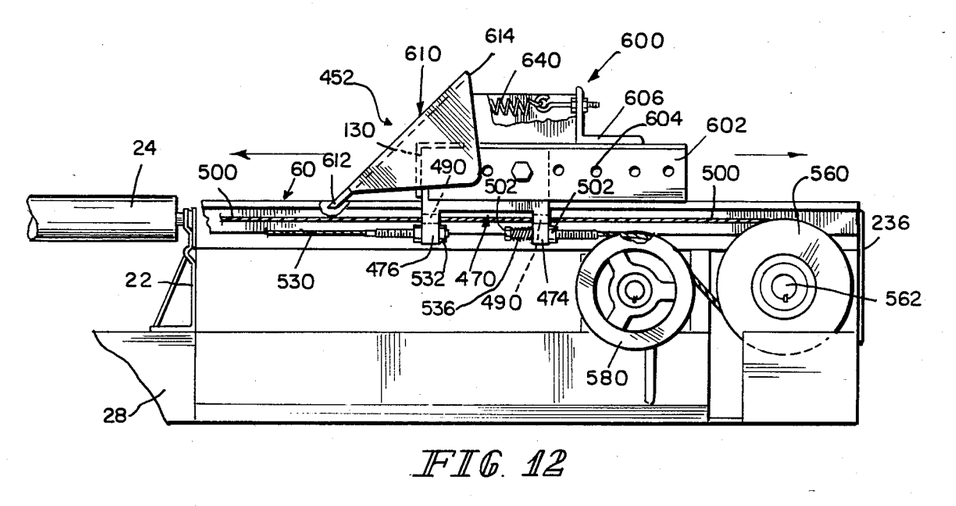
FIG. 12 is a side elevational view of the drive section and one of the trolleys of the load-pusher assembly shown in FIG. 11.

Referring now to FIGS. 11 and 12, a load-pusher assembly 450 embodying the present invention for centering loads on the load-carrying rollers 24 includes a first trolley 452 movable in a direction 454 transverse to the longitudinal direction 468 of the conveyor system and a second trolley 456 movable in a direction 458 opposed to the direction 454 of movement of the first trolley 452. The load-pusher assembly 450 includes many of the same features as the load-pusher assembly 10 previously described. Thus, where appropriate, reference numerals from FIGS. 1–10 have been applied in FIGS. 11–15 to identify structural features of the load-pusher assembly 450 which are similar to structural features of the load-pusher assembly 10.

The load-pusher assembly 450 is a single integrated unit including a conveyor section 20 which can be connected to other conveyor sections of the conveyor system, an idler section 150 located adjacent and external to one side of the conveyor section 20, and a drive section 220 located adjacent and external to the other side of the conveyor section 20. As best shown in FIG. 11, the first trolley 452 has a rest position 462 above the drive section 220 and the second trolley 456 has a rest position 466 above the idler section 150. Thus, loads are transported over the load-carrying rollers 24 of the conveyor section 20 in the longitudinal direction 468 of the conveyor system between the first and second trolleys 452 and 456, respectively, when they are in their rest positions 462, 466. Sometimes loads are either placed or pushed off-center on the load-carrying rollers 24 of the conveyor system. By simultaneously moving the first and second trolleys 452 and 456, respectively, in opposed directions, the off-center load is pushed to the center of the load-carrying rollers 24 in the conveyor section 20. Thus, the load-pusher assembly 450 is sometimes referred to as a load-centering device or apparatus.

It will be understood that except as otherwise described hereinafter, the load-pusher assembly 450 has the same structural features as the load-pusher assembly 10. Although not shown in FIG. 11, load-pusher assembly 450 includes two elongated generally T-shaped tracks 60 spanning the conveyor section 20 in spaced parallel relationship to each other and in spaced parallel relationship to the transverse axes of the load-carrying rollers 24 of the conveyor section 20. The tracks are more particularly shown and described in FIGS. 1, 2, and 4.

Continuing to refer to FIGS. 11 and 12, each trolly 452 and 456 includes a first carriage 470. The first carriages 470 of both trolleys 452 and 456 are carried by the same elongated track 60. Each trolley 452 and 456 also includes a second carriage 472. The second carriages 472 of both trolleys 452 and 456 are carried by the same elongated track 60. The first and second carriages 470 and 472, respectively, of the load-pusher assembly 450 have a structure similar to the carriages 80, more particularly shown and described in FIGS. 2 and 4. Each carriage 470 and 472 is generally C-shaped in cross section and opens downwardly. The first carriages 470 have an outer downwardly projecting leg 474 and an inner downwardly projecting leg 476. The second carriages 472 have an outer downwardly projecting leg 484 and an inner downwardly projecting leg 486. The outer legs 474 and 484 and the inner legs 476 and 486 both include upper openings 490 and lower openings 492. The upper openings 490 of legs 474 and 476 of each first carriage 470 and the upper openings 490 of legs 484 and 486 of each second carriage 472 are aligned with each other. The lower openings 492 of legs 474 and 476 of each first carriage 470 and the lower openings 492 of legs 484 and 486 of each second carriage are also aligned with each other.

Carriages 470 and 472 are linked together in a unique system for coincidentally propelling the first and second trolleys 452 and 456 in opposed directions 454 and 458 transverse to the longitudinal direction 468 of the conveyor system. The linkage system embodying the present invention produces simultaneous movement of the trolleys 452 and 456 in a smooth and efficient operation, and allows adjustment of the linkages and prevents misalignment of the trolleys 452 and 456 with respect to loads on the load-carrying rollers 24.

As shown in FIGS. 11 and 12, the propelling means includes a first drive cable 500 passing through the upper openings 490 in the legs 474 and 476 of the first carriage 470 of the first trolley 452. One end of the first drive cable 500 is connected to the lower opening 492 in the outer leg 474 of the first carriage 470 of the first trolley 452 by an adjustable pin 502. The other end of the first drive cable 500 is connected to the upper opening 490 in the inner leg 476 of the first carriage 470 of the second trolley 456 by an adjustable pin 504.

A second drive cable 510 passes through the upper openings 490 in the legs 484 and 486 of the second carriage 472 of the first trolley 452. One end of the second drive cable 510 is connected to the lower opening 492 in the outer leg 484 of the second carriage 472 of the first trolley 452 by an adjustable pin 512. The other end of the second drive cable 510 is connected to the upper opening 490 in the inner leg 486 of the second carriage 472 of the second trolley 456 by an adjustable pin 514.

A first idler cable 520 passes through the lower openings 492 in the legs 484 and 486 of the second carriage 472 of the second trolley 456. One end of the first idler cable 520 is connected to the upper opening 490 in the outer leg 474 of the first carriage 470 of the second trolley 456 by an adjustable pin 522. The other end of the first idler cable 520 is connected to the lower opening 492 in the inner leg 486 of the second carriage 472 of the first trolley 452 by an adjustable pin 524.

A second idler cable 530 passes through the lower openings 492 in the legs 474 and 476 of the first carriage 470 of the second trolley 456. One end of the second idler cable 530 is connected to the lower opening 492 of the inner leg 476 of the first carriage 470 of the first trolley 452 by an adjustable pin 532. The other end of the second idler cable 530 is connected to the upper opening 490 of the outer leg 484 of the second carriage 472 of the second trolley 456 by an adjustable pin 534.

As shown in FIGS. 11 and 12, a compression spring 536 is positioned between the adjustable pins 502 and 512 and the outer legs 474 and 484, respectively, of the carriages 470 and 472 of the first trolley 452. A compression spring 536 is also positioned between the adjustable pins 504 and 514 and the inner legs 476 and 486, respectively, of the carriages 470 and 472 of the second trolley 456. Springs 536 cushion the shock when the load pusher 450 is started. Adjustment of the pins will either increase or decrease the spring compression. Tensioning of the cables 500, 510, 520, and 530 may also be adjusted by the adjustable pins 502, 504, 512, 514, 522, 524, 532, and 534.

A pusher head 130 is mounted to the first and second carriages 470 and 472 of the first trolley 452 for pushing loads toward the center of the load-carrying rollers 24 of the conveyor section 20 in response to movement of the first trolley 452 in the direction 454. Another pusher head 130 is mounted to the first and second carriages 470 and 472 of the second trolley 456 for pushing loads toward the center of the load-carrying rollers 24 of the conveyor section 20 in response to movement of the second trolley 456 in the direction 458. By simultaneously moving the trolleys 452 and 456 in the directions 454 and 458, respectively, the load is centered therebetween on the load-carrying rollers 24 of the conveyor section 20.

While the load-pusher assembly 450 is shown and has been described with two trolleys 452 and 456, the linkage system of the present invention can also be used for propelling a single trolley 456 to push loads laterally off the load-carrying rollers 24. Operation of assembly 450 with a single trolley 456 is similar to the operation of assembly 10. With a single trolley 456, carriages 470 and 472 of the trolley 452 are removed. A single cable replaces cables 500 and 530 and a single cable replaces cables 510 and 520. Thus, with a single trolley 456, only two cables are needed. Otherwise, the structure and operation of load-pusher 450 is the same as it is with two trolleys 452 and 456.

Referring more particularly to FIG. 11, the idler section 150 includes a first pair of horizontal idler wheels 540 rotatably mounted for engaging the first idler cable 520. The idler section 150 also includes a second pair of horizontal idler wheels 550 rotatably mounted for engaging the second idler cable 530. It will be appreciated that the idler wheels 540 are mounted in different horizontal planes relative to each other and that idler wheels 550 are also mounted in different horizontal planes relative to each other. While the pairs of wheels 540 and 550 are shown mounted in one relationship to each other in FIG. 11, they may be mounted in other relationships without departing from the scope of the present invention.

Referring again to FIGS. 11 and 12, the drive section 220 of the load-pusher assembly 450 includes two vertically mounted drive wheels 560 rotatably interconnected by a shaft 562. Drive wheels 560 engage the first and second drive cables 500 and 510. A smaller drive wheel 564 is also connected to the shaft 562. A bidirectional motor 570 having an output shaft 572 is coupled to the smaller drive wheel 564 by an endless belt or chain 564 to rotate the shaft and drive wheels 560 in two different directions, indicated by the solid and broken arrows in FIG. 11. The drive section 220 further includes two vertically mounted idler wheels 580 rotatably engaging the first and second drive cables 500 and 510. Idler wheels 580 are for guiding the first and second drive cables 500 and 510 from the wheels 560 to the carriages 470 and 472 of the first trolley 452.

In operation, when shaft 562 is rotated in a first direction, as indicated by the solid arrow in FIG. 11, drive cables 500 and 510 pull the second trolley 456 in the direction 458 toward the center of the conveyor section 20. As the second trolley 456 is being pulled in the direction 458, idler cables 520 and 530 pull the first trolley 452 in the direction 454 toward the center of the conveyor section 20. A load on the load-carrying rollers 24 in the conveyor section 20 is thus positioned between the two trolleys 452 and 456. It will be appreciated that a limit switch will be provided in the manner previously explained for stopping the trolleys 452 and 456. The switch is engaged by one of the carriages 470 or 472 of one of the trolleys 452 or 456 to provide a signal for stopping the motor 570 when the trolleys are returned to their rest positions 462 and 466, respectively. A maximum forward limit switch (not shown) will provide a signal for reversing the motor 570 if there is no load on the load-carrying rollers 24. Additional limit switches will be mounted on both trolley heads and will be engaged by loads to reverse the motor 570 when the load has been centered. Both limit switches on the trolley heads must be tripped before the motor 570 is reversed.

When the motor 570 is reversed, the shaft 562 rotates in a second direction as indicated by the broken arrow in FIG. 11. The drive cables 500 and 510 pull the first trolley 452 in the direction 458 and the idler cables 420 and 430 pull the second trolley 456 in the direction 454. It will again be appreciated that at least one limit switch will be provided for engaging one of the carriages 470 or 472 of one of the trolleys 452 or 456 to provide a signal to the motor 570 when the trolleys 452 and 456 have returned to their rest positions 462 and 466, respectively.

Referring now to FIGS. 11–15, a pusher head 600 embodying the present invention may be mounted to the carriages 470 and 472 of one or both of the trolleys 452 and 456 in place of the pusher head 130. As will be explained, pusher head 600 is particularly advantageous for pushing loads that are relatively thin and would therefore not otherwise be engaged by pusher heads 130. The pusher head 600 includes side mounting brackets 602 having a plurality of apertures 604 for adjustably connecting the side mounting brackets to the first and second carriages 470 and 472 of one of the trolleys 452 and 456. A generally L-shaped support bracket 606 is connected to the side mounting brackets 602 transverse thereto.

Figure 13:
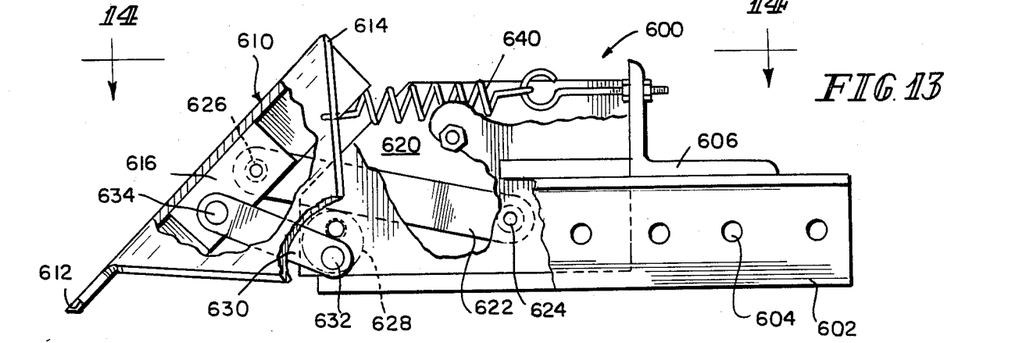
FIG. 13 is a sectional view, partly broken away, of the trolley shown in FIG. 12 with the pusher head in a down position.
Figure 14:
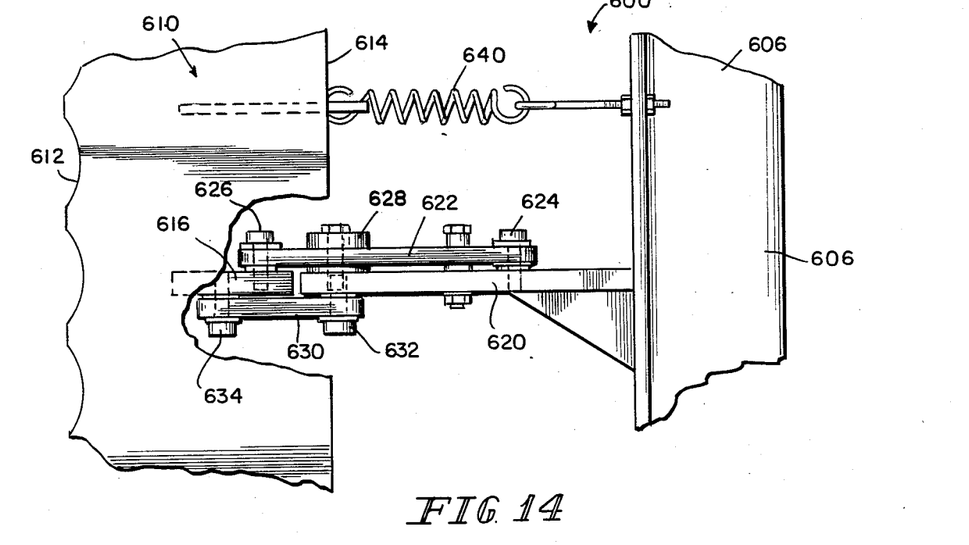
FIG. 14 is a top view, partly broken away, of the trolley shown in FIGS. 12 and 13 taken generally along lines 14—14 in FIG. 13.

The pusher head 600 includes a load-engaging panel 610 having a scalloped lower edge 612 and an upper edge 614. As best shown in FIG. 13, the load-engaging panel 610 is normally inclined rearwardly so that the upper edge 614 is nearest to the support bracket 606. The load-engaging panel 610 includes rear mounting brackets 616. At least two mounting plates 620 are connected to the transverse bracket 606 for pivotally mounting the panel 610 to the trolley 452 or 456 in the manner explained hereinafter.

The load-engaging panel 610 is pivotally connected to the mounting plates 620 by pivot arms 622. Each pivot arm 622 is connected to a mounting plate 620 at pivot point 624 and is connected to a rear mounting bracket 616 at pivot point 626. Downward movement of the pivot arm 622 is limited by a stop-limit member 628.

The load-engaging panel 610 is also pivotally connected to the mounting bracket 620 by a guide arm 630 at pivot point 632 on the mounting plate 620 and pivot point 634 on the rear mounting bracket 616. An extension spring 640 is connected to the load-engaging panel 610 in proximity to the upper edge 614, and is further connected to the transverse support bracket 606. Extension spring 640 normally biases the upper edge 614 of the load-engaging panel 610 toward the support bracket 606 so that the load-engaging panel 610 is inclined rearwardly. When the panel 610 is inclined rearwardly as shown in FIG. 13, it is in its normally down position.

Figure 15:
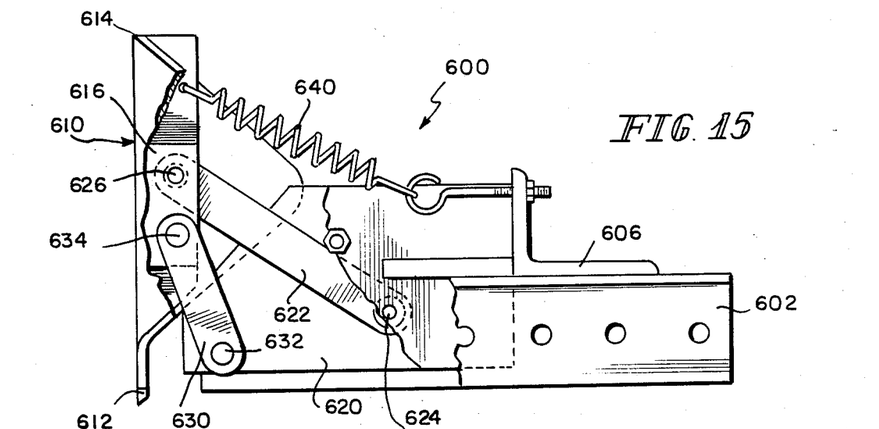
FIG. 15 is a sectional view, partly broken away, of the trolley in FIG. 13 with the pusher head in a load-pushing position.

The scallops along the lower edge 612 of the panel 610 have a radius generally equal to or greater than the radius of the load-carrying rollers 24. Thus, as a trolley 452 or 456 moves in the direction 454 of 458, respectively, toward the load, the scalloped lower edge 612 projects between the load-carrying rollers 24 to engage relatively thin loads. As the trolley 452 or 456 continues to move, the engagement of the load by the lower edge 612 forces the upper edge 614 of the panel 610 forward against the bias of spring 640. Thus, the lower edge 612 moves rearward and the upper edge 614 moves forward. This movement of the upper and lower edges 614 and 612 causes the panel 610 to move upward. The upward movement of panel 610 is guided by guide arms 630 until the panel 610 reaches a vertical position as best shown in FIG. 15. The vertical position of panel 610 is its pushing position. As the trolley 452 or 456 moves back to its rest position 462 or 466, the panel 610 disengages the load and the spring 640 pulls the upper edge 614 of the panel 610 toward the support bracket 606. Continued movement of the trolley 452 or 456 toward its rest position 462 or 466 gradually lowers the panel 610 until it resumes its down position as shown in FIG. 13.

Limit switches for reversing the motor 570 can be mounted on heads 600 and engaged or tripped by movement of the arms 622, 630, or panel 610 so that when panel 610 reaches its vertical position as shown in FIG. 15, the switches are tripped to provide a signal for reversing the motor 570. Switches on heads 600 mounted to both trolleys 452 and 456 would have to be tripped before a signal would be provided to reverse the motor 570.

What is claimed is:

1. In a roller conveyor system providing a conveyor path and means for transporting articles along the conveyor path, a load-centering assembly comprising laterally spaced side frame members supporting a plurality of the load-carrying rollers, a pair of elongated tracks spanning the space between the side frame members in parallel relationship to each other and in parallel relationship to the transverse axes of the load-carrying rollers, first and second trolleys carried by the tracks in opposed relationship, each trolley including first and second carriage for engaging the tracks and a pusher head mounted to the carriages for engaging loads on the conveyor section, a first drive linkage connecting the first carriage of the first trolley to the first carriage of the second trolley, a second drive linkage connecting the second carriage of the first trolley to the second carriage of the second trolley, bidirectional drive means engaging the first and second drive linkages for selectively moving the first and second carriages of one of the first and second trolleys simultaneously in a first direction, a first idler linkage connecting the first carriage of the second trolley to the second carriage of the first trolley, and a second idler linkage connecting the second carriage of the second trolley to the first carriage of the first trolley, the first and second idler linkages applying substantially equivalent driving force to the second and first carriages, respectively, of the first trolley in response to movement of the second trolley in the first direction so that the first and second trolleys move simultaneously in opposed directions along the tracks toward one another at substantially the same speed during an initial stage of a load-centering activity, the first and second idler linkages applying substantially equivalent driving force to the first and second carriages, respectively, of the second trolley in response to movement of the first trolley in the first direction so that the first and second trolleys move simultaneously in opposed directions along the tracks away from one another at substantially the same speed during a final stage of said load-centering activity, whereby each trolley is movable in one of a first and second direction by operation of the bidirectional drive means.

2. The assembly as recited in claim 1, further comprising an idler section positioned adjacent to one of the side frame members and a drive section positioned adjacent to the other of the side frame members, both idler and drive sections being outside the space between the side frame members.

3. The assembly as recited in claim 2 wherein each track replaces a load-carrying roller and includes a generally horizontal track member occupying a space between the rollers adjacent to the replaced roller and a generally vertical track member supporting the horizontal track member, and each carriage includes at least two generally vertical rollers for engaging the generally horizontal track member and a generally horizontal roller for engaging the generally vertical track member.

4. The assembly as recited in claim 2 wherein each drive linkage includes a drive cable and each idler linkage includes an idler cable, each of the drive and idler cables having first and second ends, the idler section includes two pairs of laterally spaced idler wheels for engaging the first and second idler cables, and the drive section includes two laterally spaced drive wheels for engaging the first and second drive cables, a shaft supporting both drive wheels for simultaneous rotation within the drive section, and a bidirectional motor for driving the shaft to rotate the drive wheels.

5. The assembly as recited in claim 4, further comprising means for connecting the first and second ends of the drive and idler cables to the carriages, the connecting means includes means for adjusting the tension of the cables.

6. The assembly as recited in claim 5 wherein each of the carriages is generally C-shaped and includes inner and outer downwardly projecting legs, each leg includes an opening to allow one of the drive and idler cables to pass therethrough, and each leg includes an adjustable pin for connecting one of the drive and idler cables thereto.

7. The assembly as recited in claim 6 wherein idler cables pass through the openings in the legs of the first and second carriages of the second trolley and drive cables pass through the openings in the legs of the first and second carriages of the first trolley.

8. The assembly as recited in claim 7 wherein the first drive cable is connected to the outer leg of the first carriage of the first trolley, passes through the openings in both legs of the first carriage of the first trolley and is connected to the inner leg of the first carriage of the second trolley, and the second drive cable is connected to the outer leg of the second carriage of the first trolley, passes through the openings in both legs of the second carriage of the first trolley and is connected to the inner leg of the second carriage of the second trolley.

9. The assembly as recited in claim 8 wherein the first idler cable is connected to the inner leg of the second carriage of the first trolley, passes through the openings in both legs of the second carriage of the second trolley, and is connected to the outer leg of the first carriage of the second trolley, and the second idler cable is connected to the inner leg of the first carriage of the first trolley, passes through the openings in both legs of the first carriage of the second trolley and is connected to the outer leg of the second carriage of the second trolley.

10. In a live roller conveyor system including laterally spaced side frame members supporting a plurality of load-carrying rollers for rotation about axes which are arranged in a common array to transport a load in a first direction, and conveyor drive means for rotating the load-carrying rollers, the conveyor drive means being positioned inside the space between the side frame members and beneath the load-carrying rollers, wherein the improvement comprises a load-centering assembly comprising first and second assembly sections, each assembly section being located outside of the space between the side frame members of the conveyor system in opposed relationship to the other, two parallel tracks for interconnecting the assembly sections and for spanning the space between the side frame members of the conveyor system, a first movable trolley carried by the tracks for pushing the load in a second direction transverse to the first direction of the conveyor system, a second movable trolley carried by the tracks for pushing the load in a third direction opposed to the second direction, propelling means for simultaneously propelling the first and second trolleys at substantially the same speed to center the load therebetween on the load-carrying rollers, the first assembly section including a bidirectional drive mechanism, the second assembly section including an idler mechanism, the propelling means including two drive linkages, first drive means for coupling the first trolley to the drive mechanism, second drive means for coupling the second trolley to the drive mechanism, and two idler linkages, each idler linkage coupling the first and second trolleys to each other, the bidirectional drive mechanism selectively applying substantially equivalent driving force to both of the second trolley via the second drive means to move the second trolley in the third direction and the first trolley via one of the idler linkages to move the first trolley in the second direction thereby centering the first and second trolleys at substantially similar speed or to both of the first trolley via the first drive means to move the first trolley in the third direction and the second trolley via the other of the idler linkages to move the second trolley in the second direction thereby retracting the first and second trolleys at substantially similar speed.

11. The assembly as recited in claim 10 wherein each trolley includes first and second carriages for engaging the tracks and a removable head supported by the carriages for engaging the load on the load-carrying rollers and pushing the load in response to movement of the trolleys.

12. The assembly as recited in claim 11, further comprising adjustable means for connecting a first drive linkage to the first carriages of both trolleys, a second drive linkage to the second carriages of both trolleys, a first idler linkage to the first carriage of the second trolley and the second carriage of the first trolley and a second idler linkage to the second carriage of the second trolley and the first carriage of the first trolley.

13. The assembly as recited in claim 12 wherein the connecting means include adjustable pins for connecting the linkages to each of the carriages of the trolleys to adjust the tension of the linkages.

14. The assembly as recited in claim 13 wherein each of the tracks includes a first track member and a second track member and each of the carriages includes at least one roller for engaging one of the track members to guide the trolleys along the tracks.

15. The assembly as recited in claim 10, further comprising two pusher heads for engaging the load and mounting means for mounting the pusher heads to the trolleys, at least one of the pusher heads having a scalloped lower edge and an upper edge, a pivot arm connecting the one pusher head to one of the trolleys to allow pivotal movement of the one pusher head relative thereto, a guide arm connecting the one pusher arm to the one trolley to define a path of movement of the one pusher head, and biasing means for biasing the upper edge of the one pusher head toward the one trolley.

16. In a conveyor system providing a conveyor path and means for transporting atricles along the conveyor path, a load-centering assembly comprising
first and second trolleys, each trolley including means for engaging articles transported along the conveyor path, a first carriage adjacent one end of each article-engaging means, and a second carriage adjacent the other end of each article-engaging means,
track means for movably guiding the carriages in a direction transverse to the conveyor path,
bidirectional drive means for interconnecting the carriages to apply substantially equivalent drive forces to each carriage during a load-centering activity cycle so that both trolleys move simultaneously along the track means in opposed directions at substantially the same speed causing both carriages of each trolley to remain in alignment during centering and separating movement of the trolleys, and said bidirectional drive means includes:
a power means and drive linkage means connecting said trolleys and transmitting drive forces from said power means to said trolleys,
a first idler linkage connecting the first carriage of the second trolley to the second carriage of the first trolley, and
a second idler linkage connecting the second carriage of the second trolley to the first carriage of the first trolley, the first and second idler linkages applying substantially equivalent driving force to the second and first carriages, respectively, of the first trolley in response to movement of the second trolley in the first direction so that the first and second trolleys move simultaneously in opposed directions along the tracks toward one another at substantially the same speed during an initial stage of a load-centering activity, the first and second idler linkages applying substantially equivalent driving force to the first and second carriages, respectively, of the second trolley response to movement of the first trolley in the first direction so that the first and second trolleys move simultaneously in opposed directions along the tracks away from one another at substantially the same speed during a final stage of said load-centering activity.

17. The load-centering assembly of claim 10, wherein said drive linkage means includes
   a first drive linkage connecting the first carriage of the first trolley to the first carriage of the second trolley,
   a second drive linkage connecting the second carriage of the first trolley to the second carriage of the second trolley, and
   said power means engaging the first and second drive linkages for selectively moving in simultaneous relation the first and second carriages of one of the first and second trolleys in a first direction.

18. The assembly as recited in claim 17, wherein each drive linkage includes a drive cable and each idler linkage includes an idler cable, each of the drive and idler cables having first and second ends, the idler section includes two pairs of laterally spaced idler wheels for engaging the first and second idler cables, and the power means includes two laterally spaced drive wheels for engaging the first and second drive cables, a shaft supporting both drive wheels for simultaneous rotation within the power means, and a bidirectional motor for driving the shaft to rotate the drive wheels.

19. In a conveyor system providing a conveyor path and means for transporting articles along the conveyor path, a load-centering assembly comprising
   first and second trolleys, each trolley including pusher means for engaging articles transported along the conveyor path, each pusher means being pivotally mounted to its companion trolley for movement between inclined and substantially vertical positions,
   means for moving said trolleys and said pushers toward each other to move said articles to a load-centered position, means for maintaining said pushers in said inclined position during movement of said articles, said means for maintaining said pushers permits said pushers to pivot to said vertical position when said articles have been moved to said load-centered position,
   track means for movably guiding the trolleys in opposite directions transverse to the conveyor path, and
   sensor means for indicating the arrival of at least one of the oppositely moving trolleys in said load-centering position in response to movement of the pusher means to its vertical position.

20. The load-centering assembly of claim 19, said means for moving comprising bidirectional drive means for moving the first and second trolleys in opposite directions, the drive means being coupled to the sensor means and including means for preventing movement of the trolleys past their respective load-centering positions in response to a signal provided by the sensor means.

21. The load-centering assembly of claim 19, said means for moving comprising bidirectional drive means for moving the first and second trolleys in opposite directions, the drive means being coupled to the sensor means and including means for reversing movement of the trolleys in response to a signal provided by the sensor means.

* * * * *

UNITED STATES PATENT AND TRADEMARK OFFICE
CERTIFICATE OF CORRECTION

PATENT NO. : 4,595,092
DATED : June 17, 1986
INVENTOR(S) : Thomas A. Dyer

It is certified that error appears in the above-identified patent and that said Letters Patent is hereby corrected as shown below:

Column 1, line 7, change "file" to --filed--.

Column 6, line 19, change "whioh" to --which--.

Column 15, line 64, change "trolly" to --trolley--.

Column 19, line 16, change "of" to --or--.

Column 22, line 30 (claim 16), change "atricles" to --articles--.

Column 23, line 1 (claim 16), after "trolley", insert --in--.

Column 23, line 7 (claim 17), change "10" to --16--.

Signed and Sealed this

Seventeenth Day of February, 1987

*Attest:*

DONALD J. QUIGG

*Attesting Officer*  *Commissioner of Patents and Trademarks*